US007662212B2

(12) United States Patent
Mullette et al.

(10) Patent No.: US 7,662,212 B2
(45) Date of Patent: Feb. 16, 2010

(54) MEMBRANE POST TREATMENT

(75) Inventors: Daniel Mullette, New South Wales (AU); Joachim Muller, New South Wales (AU); Neeta Patel, New South Wales (AU)

(73) Assignee: Siemens Water Technologies Corp., Warrendale, PA (US)

( * ) Notice: Subject to any disclaimer, the term of this patent is extended or adjusted under 35 U.S.C. 154(b) by 513 days.

(21) Appl. No.: 10/564,024

(22) PCT Filed: Jul. 8, 2004

(86) PCT No.: PCT/AU2004/000922

§ 371 (c)(1),
(2), (4) Date: Jan. 9, 2006

(87) PCT Pub. No.: WO2005/002712

PCT Pub. Date: Jan. 13, 2005

(65) Prior Publication Data

US 2006/0157404 A1 Jul. 20, 2006

(30) Foreign Application Priority Data

Jul. 8, 2003 (AU) ............... 2003903507

(51) Int. Cl.
*B01D 39/20* (2006.01)
*B01D 53/22* (2006.01)

(52) U.S. Cl. ............... 95/45; 96/4; 96/11; 96/13; 96/14; 96/54; 210/490; 210/640; 210/650; 210/651; 210/500.27; 210/500.28; 210/500.42; 427/244; 427/245; 427/331; 427/430.1; 55/524; 55/DIG. 5

(58) Field of Classification Search ............ 96/4, 96/11, 12, 13, 14; 95/95, 45, 50, 52, 54; 210/490, 640, 650, 651, 652, 653, 654, 500.21, 210/500.27, 500.28, 500.42; 427/244, 245, 427/331, 430.1; 55/524, DIG. 5
See application file for complete search history.

(56) References Cited

U.S. PATENT DOCUMENTS

| 3,556,305 | A | * | 1/1971 | Shorr | ............... 210/490 |
| 4,033,817 | A | * | 7/1977 | Gregor | ............... 435/44 |
| 4,142,526 | A | * | 3/1979 | Zaffaroni et al. | ............... 424/424 |
| 4,439,217 | A | * | 3/1984 | Yamabe et al. | ............... 96/4 |
| 4,559,139 | A | * | 12/1985 | Uemura et al. | ............... 210/490 |
| 4,758,251 | A | * | 7/1988 | Swedo et al. | ............... 96/12 |
| 4,886,668 | A | * | 12/1989 | Haslam et al. | ............... 424/424 |
| 4,892,739 | A | * | 1/1990 | Shah et al. | ............... 424/473 |
| 4,909,943 | A | * | 3/1990 | Fibiger et al. | ............... 210/500.27 |
| 6,056,903 | A | * | 5/2000 | Greenwood et al. | ............... 427/244 |
| 6,602,391 | B2 | * | 8/2003 | Serikov | ............... 204/464 |
| 6,699,611 | B2 | * | 3/2004 | Kim et al. | ............... 429/30 |

FOREIGN PATENT DOCUMENTS

| EP | 229019 B1 | | 9/1991 |
| JP | 2-9498 | * | 1/1990 |
| WO | WO96/14913 A1 | | 5/1996 |

OTHER PUBLICATIONS

International Search Report dated Sep. 17, 2004 for PCT/AU2004/000922.

* cited by examiner

*Primary Examiner*—Jason M Greene (57) ABSTRACT

The invention relates to polymeric ultrafiltration or microfiltration membranes of, for instance, Halar, PVDF or PP, incorporating PVME or vinyl methyl ether monomers. The PVME may be present as a coating on the membrane or both. The membranes are preferably hydrophilic with a highly asymmetric structure with a reduced pore size and/or absence of macrovoids as a result of the addition of PVME. The PVME maybe cross-linked. The invention also relates to methods of hydrophilising membranes and/or preparing hydrophilic membranes via thermal or diffusion induced phase separation processed.

47 Claims, 5 Drawing Sheets

FIG 5 a) Standard Fibre (no PVME)

b) 0.4% PVME c) 2.3wt% PVME

MEMBRANE POST TREATMENT

CROSS REFERENCE TO RELATED APPLICATIONS

This application is a U.S. national stage application and claims the benefit under 35 U.S.C. § 371 of International Application No. PCT/AU2004/000922 filed on Jul. 8, 2004, entitled MEMBRANE POST TREATMENT, which is based on Australian Patent Application No. 2003903507 filed on Jul. 8, 2003, entitled MEMBRANE POST TREATMENT, each of which is entirely incorporated herein by reference for all purposes, and to which this application claims the benefit of priority.

FIELD OF THE INVENTION

The invention relates to compositions and methods for the hydrophilisation of membranes, particularly hollow fibre membranes for use in microfiltration and ultrafiltration. The invention also relates to membranes prepared in accordance with these methods.

BACKGROUND ART

The following discussion is not to be construed as an admission with regard to the common general knowledge.

Synthetic membranes are used for a variety of applications including desalination, gas separation, filtration and dialysis. The properties of the membranes vary depending on the morphology of the membrane i.e. properties such as symmetry, pore shape and pore size and the polymeric material used to form the membrane.

Different membranes can be used for specific separation processes, including microfiltration, ultrafiltration and reverse osmosis. Microfiltration and ultrafiltration are pressure driven processes and are distinguished by the size of the particle or molecule that the membrane is capable of retaining or passing. Microfiltration can remove very fine colloidal particles in the micrometer and sub micrometer range. As a general rule, microfiltration can filter particles down to 0.1 µm, whereas ultrafiltration can retain particles as small as 0.01 µm and smaller. Reverse Osmosis operates on an even smaller scale.

As the size of the particles to be separated decreases, the pore size of the membrane must decrease and the pressure required to carry out the separation increases.

A large surface area is needed when a large filtrate flow is required. One known technique to make filtration apparatus more compact is to form a membrane in the shape of a hollow porous fibre. Modules of such fibres can be made with an extremely large surface area per unit volume.

Microporous synthetic membranes are particularly suitable for use in hollow fibres and are produced by phase inversion. In this process, at least one polymer is dissolved in an appropriate solvent and a suitable viscosity of the solution is achieved. The polymer solution can be cast as a film or hollow fibre, and then immersed in a precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 µm), and altering chemical, thermal and mechanical properties.

Microporous phase inversion membranes are particularly well suited to the application of removal of viruses and bacteria. Of all types of membranes, the hollow fibre contains the largest membrane area per unit volume.

Flat sheet membranes are prepared by bringing a polymer solution consisting of at least one polymer and solvent into contact with a coagulation bath. The solvent diffuses outwards into the coagulation bath and the precipitating solution will diffuse into the cast film. After a given period of time, the exchange of the non-solvent and solvent has proceeded such that the solution becomes thermodynamically unstable and de-mixing occurs. Finally a flat sheet is obtained with an asymmetric or symmetric structure.

Hydrophobic surfaces are defined as "water hating" and hydrophilic surfaces as "water loving". Many of the polymers used in the manufacture of porous membranes are hydrophobic polymers. Water can be forced through a hydrophobic membrane, but usually only under very high pressure (150-300 psi). Membranes may be damaged at such pressures and under these circumstances generally do not become wetted evenly.

Hydrophobic microporous membranes are characterised by their excellent chemical resistance, biocompatibility, low swelling and good separation performance. Thus, when used in water filtration applications, hydrophobic membranes need to be hydrophilised or "wet out" to allow water permeation. Some hydrophilic materials are not suitable for microfiltration and ultrafiltration membranes that require mechanical strength and thermal stability since water molecules present in the polymer can play the role of plasticizers.

Currently, poly(tetrafluoroethylene) (PTFE), Polyethylene (PE), Polypropylene (PP) and poly(vinylidene fluoride) (PVDF) are the most popular and available hydrophobic membrane materials. Poly(ethylene-chlorotrifluoroethylene) sold under the trademark HALAR is another hydrophobic material showing promise as a membrane polymeric material.

Poly(vinylidene fluoride) (PVDF) is a semi-crystalline polymer containing a crystalline phase and an amorphous phase. The crystalline phase provides good thermal stability whilst the amorphous phase adds some flexibility to the membrane. PVDF exhibits a number of desirable characteristics for membrane applications, including thermal resistance, reasonable chemical resistance (to a range of corrosive chemicals, including sodium hypochlorite), and weather (UV) resistance.

While PVDF has to date proven to be one of the most desirable options from among those materials suitable for microporous membranes, the search continues for membrane materials which will provide better chemical stability and performance while retaining the desired physical properties required to allow the membranes to be formed and worked in an appropriate manner.

Given the good membrane forming properties of hydrophobic membranes and their favourable mechanical and chemical properties, as well as the general familiarity in the industry with such materials, one approach to hydrophilic membranes is to synthesise membranes based around a hydrophobic polymer but with modification of the hydrophobic/hydrophilic balance of the membrane. The two main modes of modifying membrane property are (i) to modify the starting materials, reagents or conditions used to produce the membrane or (ii) to modify the membrane after production (post-treatment). Combinations of the two approaches are also possible, for example, introducing components into a membrane which alone may not alter membrane function, but which do interact with reagents subsequently applied to produce a membrane with a modified property.

DESCRIPTION OF THE INVENTION

The present applicants have found that, in certain cases, Poly (VinylMethylEther) (PVME) can be used to modify, and in particular, reduce, the hydrophobicity of certain hydrophobic membranes. The PVME can be incorporated either by means of post-treatment, such as by soaking hollow-fibre membranes in a solution of PVME, or by incorporating PVME into the dope solution for forming the membrane. Either approach could be demonstrated for a variety of reaction types, including different types of membranes such as Poly(vinylidene fluoride) (PVDF), Poly(ethylene-chlorotrifluoroethylene) sold under the trademark HALAR and Poly (propylene) (PP).

PVME as a post treatment was found to make PVDF and Poly(ethylene-chlorotrifluoroethylene) (sold under the trademark HALAR) membranes hydrophilic, although the treatment was also useful on PP membranes.

PVME as a membrane additive was found to induce variations in the pore structure of PVDF such as asymmetry, as well as to impart hydrophilicity to the final membrane. This was apparent for both TIPS and DIPS methods of making a membrane.

As used herein, PVME also encompasses not only the polymeric form of the product, but also the monomeric form of the compound, namely vinylmethyl ether, as well as di-, tri-, and oligomeric forms.

SUMMARY

According to a first aspect, the invention provides a polymeric ultra or microfiltration membrane incorporating PVME. The polymeric ultra or microfiltration membrane may incorporate a coating of PVME or, alternatively include a homogeneous dispersion of PVME throughout the polymer or both.

The polymeric membrane may include a heterogeneous dispersion of PVME throughout the polymer.

In another aspect, the invention provides a hydrophilic polymeric membrane including one or more of Poly(ethylene-chlorotrifluoroethylene) sold under the trademark HALAR, PVDF or PP.

In yet another aspect, the invention provides a hydrophilic polymeric membrane having a highly asymmetric structure, preferably formed from one or more of Poly(ethylene-chlorotrifluoroethylene) sold under the trademark HALAR, PVDF or PP.

Preferably the membrane has a reduced pore size as a result of the addition of PVME. Preferably also, the membrane is substantially free from macrovoids.

Preferably, the membrane according to the present invention contains cross linked PVME. The membrane according to the present invention may incorporate adsorbed PVME and embedded PVME and wherein adsorbed PVME is cross-linked with embedded PVME.

Preferably the polymeric ultra or microfiltration membranes of the present invention contain PVDF and PVME in a ratio of 0.1:24 to 0.5 to 24, more preferably in a ratio of 0.5:18 to 1:18 and even more preferably in a ratio of 0.4:13 to 2.3:13.

The polymeric ultra or microfiltration membranes preferably contain 0.4 to 30 wt % PVME.

In one embodiment, polymeric ultra or microfiltration membranes of the present invention on soaking for 8 hours produce a detectable quantity of PVME, or for example, on soaking for 48 hours produces a leachate having at least 5 ppm PVME.

Preferably the hydrophobic polymeric ultra or microfiltration membranes are rendered hydrophilic by contacting the membrane with an aqueous or alcoholic solution of PVME with a concentration 0.05 to 5 wt %. More preferably, the polymeric ultra or microfiltration membranes are rendered hydrophilic by contacting the membrane with an aqueous or alcoholic solution of PVME with a concentration of 0.05 to 5 wt %, at a pressure of 0.5 to 50 bar.

According to a second aspect, the invention provides a method of hydrophilising a membrane prepared from a polymeric material, said method including the step of contacting said polymeric material with a compatible at least partially water soluble polymeric hydrophilising agent.

Preferably, the at least partially water soluble polymeric hydrophilising agent is soluble in an amount of at least 5-10 g/l at standard temperature and pressure. Preferably, the at least partially water soluble polymeric hydrophilising agent contains vinylmethyl ether monomers. More preferably, the polymeric hydrophilising agent is polyvinylmethyl ether (PVME).

The polymeric hydrophilising agent may be a copolymer containing vinylmethyl ether monomer and at least one other co-monomer. It is preferred that the vinylmethyl ether monomer is present in an amount of at least 50 mole % of the polymeric hydrophilising agent.

If a co monomer is used, it is preferred if the co-monomer is selected from the group consisting of: co-polymerisable acrylate monomers and co-polymerisable vinyl monomers.

More preferably, the co-monomer is selected from the group consisting of: vinyl acetate, acrylic acid, methyl acrylate, methyl methacrylate, allyl methacrylate, ethyl acrylate, ethyl methacrylate, methacrylic acid, fumaric acid, monoesters of fumaric acid, diesters of fumaric acid, maleic acid, monoesters of maleic acid, diesters maleic acid, diallyl maleate maleic anhydride, esters of adipic acid (divinyl adipate), ethylenically unsaturated carboxamides (acrylamide), ethylenically unsaturated carbo-nitriles (acrylonitrile), ethylenically unsaturated sulfonic acids (vinylsulfonic acid).

According to a third aspect the invention provides a method of modifying the hydrophobic/hydrophilic balance of a polymer membrane prepared from a polymeric material, said method including the step of contacting said polymeric material with polyvinylmethyl ether (PVME) to produce a modified polymeric membrane.

Preferably the polymeric membrane is coated with PVME.

The membrane may be in the form of an ultrafiltration membrane or a microfiltration membrane In one preferred embodiment, the polymeric material is a hydrophobic polymer and hydrophobic/hydrophilic balance of the polymer is modified to provide a hydrophilic modified polymeric membrane.

For preference, the polymeric material is poly(vinylidene fluoride) (PVDF), poly(ethylene-chlorotrifluoroethylene) sold under the trademark HALAR and poly(propylene) (PP) or mixtures thereof. Poly(vinylidene fluoride) (PVDF) and poly(ethylene-chlorotrifluoroethylene) sold under the trademark HALAR are particularly preferred.

The polymeric material may be a formed membrane treated with a solution of PVME. Preferably, the polymeric material is treated with a solution of PVME at a concentration and for a time sufficient to allow PVME saturation of said membrane to take place. In one preferred embodiment, the polymeric material is post treated by soaking in a solution of PVME in ethanol. In another preferred embodiment, the polymeric material is post treated by soaking in a solution of PVME in water It is preferred that the concentration of PVME is less than 10%, more preferably less than 5% and even more preferably less than 3%, however it is preferred that the concentration of PVME is greater then 0.1%.

A range of 1 to 5% is particularly preferred.

It is preferred that treatment with PVME takes place for between 5 minutes and 16 hours. Preferably, such treatment with a solution of PVME is followed by a rinsing stage to remove unbound PVME.

In an alternative embodiment, the polymeric material is treated with PVME by means of adding PVME to a membrane dope prior to casting. The membrane dope may be cast via a thermally induced phase separation process or by a diffusion induced phase separation process.

Preferably, the membrane dope includes PVME in an amount up to 1 wt % when a TIPS process is employed, or higher if a DIPS process is used. Preferably, the PVME is dissolved in a polymer dope/solvent/non-solvent mixture. More preferably, the solvent/non-solvent mixture includes a PVME solvent and PVME non-solvent Preferably, the PVME solvent possesses weak polarity, for example, glyceroltriacteate. Preferably, the PVME non-solvent is strongly polar, for example, diethylene glycol, triethylene glycol, 1,4-butanediol or mixtures thereof.

Preferably, the solvent mixture includes from 40-60% non-solvent.

Preferably, the solvent mixture includes PVME in an amount of 0.1-2 wt %, and more preferably in an amount of 0.7-1 wt %.

Preferably, when the method of casting is a TIPS process, it further includes treatment with a coating solution which most preferably contains a solvent and a non-solvent. When a DIPS process is used, it is preferred that N-methylpyrrolidone is present as a solvent, and water is present as non-solvent.

The present invention also provides a method wherein PVME is incorporated in the membrane dope and formed into a membrane, and wherein said membrane is further treated with PVME, for example the membrane is treated to cross-link incorporated and adsorbed PVME. A preferred method of cross linking is e-beam irradiation.

PVME readily cross-links upon irradiation with electron beams or γ-radiation and is of very low toxicity, as are the starting vinyl methyl ether monomer and its degradation products. This makes it a suitable candidate for many applications requiring biocompatibility. Further, despite already possessing a low toxicity, the starting vinyl ether monomer is readily hydrolysed at pH 7 or below and so can be readily removed, reducing even further any risk of membrane contamination by residual monomer.

PVME was surprisingly found to be effective at hydrophilising otherwise hydrophobic PP, PVDF and Poly(ethylene-chlorotrifluoroethylene) (sold under the trademark HALAR) membranes either by soaking the membrane as a post treatment or by including the PVME as a hydrophilising agent incorporated in the membrane dope. Hydrophilisation can be achieved either by soaking the membranes in a solution of PVME in a suitable solvent, for example, ethanol or water, preferably at a level greater than 0.5 wt. %. PVDF and Poly(ethylene-chlorotrifluoroethylene) (sold under the trademark HALAR) membranes in particular demonstrate long term stability with PVME adsorbed onto the surface, although PVME also appears to have good affinity with PP. Leaching tests show minimal leaching of PVME from the membranes after 10 days with the PVDF and Poly(ethylene-chlorotrifluoroethylene) (sold under the trademark HALAR) samples are all still hydrophilic after this period of time.

Including PVME into the dope via a TIPS process was also successful in imparting hydrophilicity to the membranes. The proportion of PVME in the dope was most preferably between 0.1 and 0.5%, although this is dependent upon the amount of non-solvent in the dope. If the proportion of non-solvent used was lower than 60wt % a larger amount of PVME could be incorporated into the dope. Surprisingly, it was found that the introduction of PVME into membrane dope induced structural changes in the membranes, such as increased asymmetry and smaller pores in addition to imparting hydrophilicity to the membrane.

PVME could also be successfully incorporated into the dope via a DIPS process. As well as modifying the hydrophilic/hydrophobic balance, the presence of PVME significantly altered the base PVDF membrane structure and suppressed the formation of macrovoids. In the case of the DIPS process, it was found desirable to employ higher concentrations of PVDF as well as higher concentrations of PVME to achieve a high permeability membrane with good virus/dextran retention.

PVME modified membranes can be further modified, for example, by irradiation with electrons (e-beam). PVME is cross-linkable and under irradiation will cross-link on the membrane surface. Irradiation can be applied either to membranes that have been post-treated in PVME or to membranes that have had PVME included in the dope. PVME may, under appropriate conditions, also cross-link with PVDF when this is present in the membrane matrix.

PVDF and fluoropolymers with a similar structure (e.g. PVC, PVF, and PVDC) are known to undergo some cross-linking upon irradiation with electrons or γ-radiation and similar crosslinking with PVME is also possible. Those skilled in the art will appreciate that when γ-radiation is used on fluoropolymers, caution must be taken because there is possibility of chain scission (degradation).

Membranes with a cross-linkable hydrophilising agent in the dope may also be post-treated with additional cross-linkable agent (which may be the same or different to that used in the dope) and subsequently exposed to e-beam. This allows the adsorbed crosslinkable agent to cross-link with the embedded PVME agent, reducing the opportunity for the former to be desorbed from the surface.

A specific example of this is the preparation of membranes incorporating PVME in the dope which are also be post-treated with an aqueous PVME solution and subsequently exposed to e-beam irradiation. Without wishing to be bound by theory, it is believed that this allows adsorbed PVME to cross-link with embedded PVME and be anchored to the surface of the membrane, reducing the opportunity for the PVME to be desorbed from the surface and dissolve into solution.

EXAMPLES

Post Treatment Studies

The post-treatment of a variety of membranes with a cross-linkable hydrophilising agent was investigated. PVDF, Poly(ethylene-chlorotrifluoroethylene) (sold under the trademark HALAR) and PP membranes were all tested. For the Poly(ethylene-chlorotrifluoroethylene) (sold under the trademark HALAR) membranes, both MF (microfiltration) and UF (ultrafiltration) membranes were tested.

The general procedure for treating the pre-prepared PP and PVDF membranes was as follows:

The dry membrane was soaked in a PVME (Lutonal M40) solution with, solvent, concentration and soaking time as specified. The membrane was subsequently removed from the PVME solution and placed into wash water for 4 hrs. The membrane was then dried for about 4 hrs The membrane was then tested for the 'wicking' of an aqueous solution of dye and the permeability of the fibre was also tested.

A sample of the membrane was then soaked in water at 65° C. for 1 hr and the permeability of the heat-treated membrane was also tested.

The general procedure for treating the pre-prepared Poly(ethylene-chlorotrifluoroethylene) (sold under the trademark HALAR) membranes was more elaborate due to glycerol-loaded pores which are present as a result of the method of production of Poly(ethylene-chlorotrifluoroethylene) (sold under the trademark HALAR) membranes. The membrane was soaked in ethanol for 12 hrs, followed by water for 15 minutes.

The membrane was then soaked in a PVME (Lutonal M40) solution with, solvent, concentration and soaking time as specified. The membrane was subsequently removed from the PVME solution and placed into wash water for 4 hrs. The membrane was then dried for about 4 hrs before being resoaked in an aqueous solution of 20 wt % glycerol for 16 hr to reload the pores. The membrane was then dried for 24 hr and the permeability of the standard untreated and treated membranes was tested.

All fibres were treated as described, with various concentrations of PVME and for varying lengths of time. Tables 1-3 below give the results from each variation of each fibre tested.

Wicking is said to have occurred if a solution of dye is spontaneously absorbed into a fibre that is partially submerged vertically in such a solution and travels upwards above the solution meniscus. This can clearly be seen in strongly hydrophilic fibres (capillary action) but not in hydrophobic fibres. Wicking tests were not conducted with the Poly(ethylene-chlorotrifluoroethylene) (sold under the trademark HALAR) fibres, as an artificial result would arise as a result of the glycerol in the pores.

TABLE 1

PVDF - Wicking and Permeability results

| Fibre Type | PVDF MF | PVDF MF | PVDF MF | PVDF MF | PVDF MF |
|---|---|---|---|---|---|
| Solution Details | Ethanol wet | 3 wt % PVME in Ethanol | 1 wt % PVME in Water | 0.5 wt % PVME in Water | 0.1 wt % PVME in Water |
| Treatment Time | 5 min | 5 min | 16 hr | 16 hr | 16 hr |
| Break Extension (%) | 77 | 79 | 79 | 79 | — |
| Fibre wicking? | No | Yes | Yes | Yes | No |
| Permeability after PVME treatment (LMH/bar) | 1632 | 1966 | 1521 | 1494 | No flux |
| Permeability after 65° C. water soak (LMH/bar) | 1632 | 1442 | 1635 | 1551 | No flux |

The results in Table 1 demonstrate that PVDF is made hydrophilic by PVME post-treatment. Different concentrations of PVME (0-3 wt %) in water or in ethanol were investigated. The concentration of PVME in solution appears unimportant provided it is above a certain critical value, which is believed to be about 0.1%. There would appear to be little benefit in using more than 0.5% PVME. It is postulated that this may be dependent upon the fibre density in the solution, or in other words the ratio of available membrane surface area to free solution, since if PVME is adsorbing to the membrane surface there is a minimum PVME quantity in solution required to obtain a totally hydrophilic membrane surface. There will simply be no room on the membrane surface for any excess PVME to adsorb and as a consequence will be washed out of the membrane upon filtration.

If too little PVME is added, the surface may not be completely hydrophilic which may in turn affect complexing and linking.

TABLE 2

PP - Wicking and Permeability results

| | Fibre Type | | | |
|---|---|---|---|---|
| | PP MF | PP MF | PP MF | PP MF |
| Solution Details | Ethanol wet | 1 wt % PVME in Ethanol | 1 wt % PVME in Water | 0.5 wt % PVME in Water |
| Treatment Time | 5 min | 5 min | 16 hr | 16 hr |
| Fibre Wicking? | No | Yes | No | No |
| Permeability (LMH/bar) | 2726 | 1339 | No flux | No flux |
| Retreated Permeability (LMH/bar) | 2726 | 1442 | No flux | No flux |

The results in Table 2 show that PP can be made hydrophilic as demonstrated by wicking (see column 2 of Table 2) but the permeability is only about half that of the standard untreated PP membrane fibre.

It appears from these results that the interaction of PP with PVME is not the same as the interaction between PVDF and PVME. Without wishing to be bound by theory, it is postulated that the PVME is more strongly attracted to the PVDF surface that is slightly polar, rather than the PP surface which may be considered entirely non-polar. It seems that this affinity may be the effect that is dominating rather than that PVME is simply attracted to a hydrophobic surface in preference over solution in water.

TABLE 3

Poly(ethylene-chlorotrifluoroethylene)
(sold under the trademark HALAR)-
Wicking and Permeability results

| | Fibre Type | | | |
|---|---|---|---|---|
| | HALAR MF | HALAR MF | HALAR UF | HALAR UF |
| Solution Details | Ethanol wet | 2 wt % PVME in Water | Ethanol wet | 2 wt % PVME in Water |
| Treatment Length | 5 min | 16 hr | 5 min | 16 hr |
| Permeability (LMH/bar) | 2039 | 1620 | 527 | 289 |

The permeability of Halar Poly(ethylene-chlorotrifluoroethylene) sold under the trademark HALAR is slightly reduced as a result of PVME treatment. Generally permeability measurements for Poly(ethylene-chlorotrifluoroethylene) (sold under the trademark HALAR) MF fibre range between 1500-2000 LMH/bar, with Poly(ethylene-chlorotrifluoroethylene) (sold under the trademark HALAR) UF membranes varying between 200-600 LMH/bar.

The results from the Poly(ethylene-chlorotrifluoroethylene) (sold under the trademark HALAR) membranes are difficult to quantify with precision because it is believed that glycerol in the pores results in lower initial clean water permeabilities that slowly increase towards a fixed value as the glycerol is completely removed from the pores. This may explain why the ethanol washed fibres have a slightly 5 higher apparent permeability, since glycerol is more readily soluble in ethanol than in water.

Poly(ethylene-chlorotrifluoroethylene) (sold under the trademark HALAR) has a mildly polar structure not dissimilar to PVDF and the affinity between HALAR and PVME replicate to a degree the interaction between PVME and PVDF. The results below give an indication of the permanency of the treatment of Poly(ethylene-chlorotrifluoroethylene) (sold under the trademark HALAR) membranes with PVME.

Wicking can clearly be seen in strongly hydrophilic fibres (capillary action) but not in hydrophobic fibres.

The leaching tests (FIG. 1) show that the PVME is leached out initially at a high rate but this reduces over time until eventually a stable solution concentration is achieved.

Figure 1:
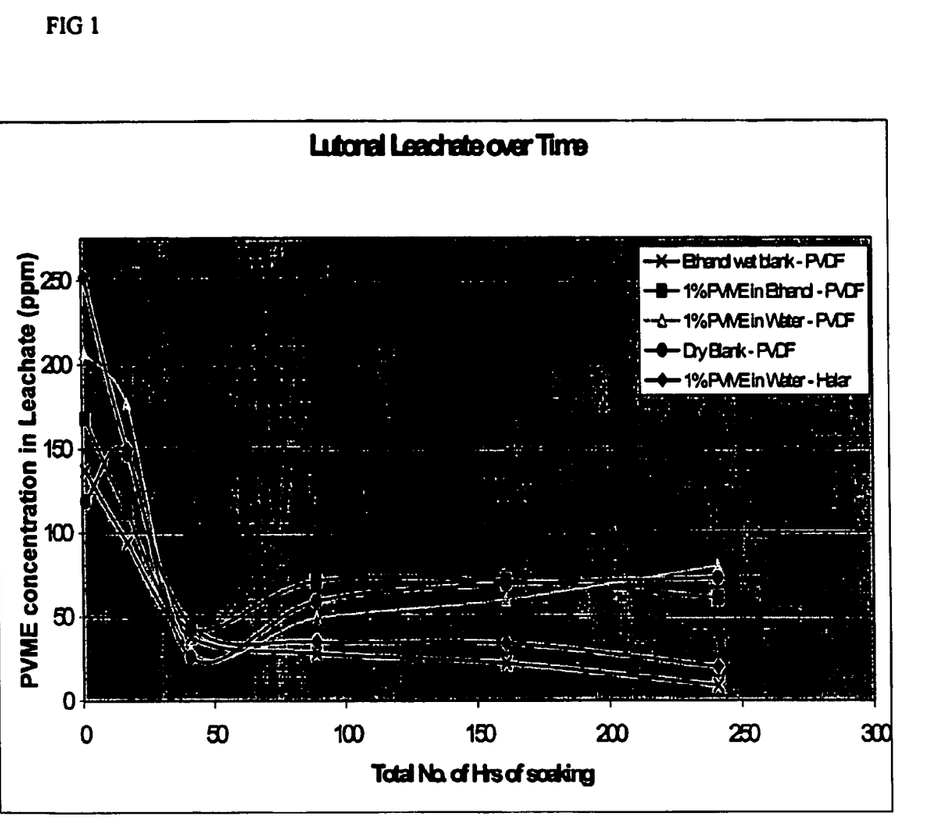
FIG. 1 depicts the results of leaching tests for PVME in accordance with the present invention.

Leaching tests were conducted by soaking the fibres in reverse osmosis (RO) water for 240 hrs. The leach water was refreshed every 24 hours (the wash water being replaced a total of 9 times) and an aliquot was analysed by UV-Vis absorption and compared against a PVME calibration curve. The results above show that there is an immediate decline in the detection of PVME which this occurs for both wet and dry standards as well as for all samples. The biggest decline comes from the samples soaked in PVME, while of these samples the fibres soaked in 1 wt % ethanolic PVME have the lowest starting concentration. The general trend appears to be that some PVME leaches out immediately but after approximately 48 hrs there is no significant change in the PVME level in the wash water compared to the standard. As described above however, the change in the concentration cannot be considered significant compared to the standards on the basis of this examination.

The dry standard appears at first to increase in PVME concentration initially, to a concentration that is above the sample soaked in 1 wt % ethanolic PVME and the Poly(ethylene-chlorotrifluoroethylene) (sold under the trademark HALAR) sample.

An ethanol-wet standard and a dry standard were both used because there can be very small quantities of residual solvent in the PVDF membranes that are only slightly soluble in water and although very difficult to leach out entirely would nevertheless affect the UV-Vis readings. Washing with ethanol prior to UV-Vis analysis should remove any residual solvent from the membrane. This may explain why the PVDF samples appear to rise in PVME leach concentration or have a slightly higher steady-state value rather than the ethanol-wet sample. However, it is also possible that the PVME may bind more firmly to the Poly(ethylene-chlorotrifluoroethylene) (sold under the trademark HALAR) surface rather than the PVDF surface, from an aqueous solution.

The permeabilities of a number of membranes before and after PVME treatment are shown in Table 4.

In order to test the permeability after leaching, the fibres were removed from the RO water and dried at room temperature. The standard (non-treated) fibres were wet with ethanol prior to testing the permeability, while the treated fibres were simply tested with water. The results for permeability show that the fibres are still hydrophilic after this period of leaching, but that the permeabilities have dropped noticeably. This is a relatively uniform drop however and is between 40-55% across all samples including the standards, with the exception of the samples soaked in 1 wt % aqueous PVME.

TABLE 4

MEMBRANE PERMEABILITY BEFORE
AND AFTER PVME TREATMENT

| Description | Permeability Before | Permeability After | % Change |
|---|---|---|---|
| Ethanol washed Blank - PVDF | 1542 | 984 | −36.2 |
| 1 wt % PVME in Ethanol - PVDF | 1442 | 855 | −40.7 |
| 1 wt % PVME in Water - PVDF | 1505 | 307 | −79.8 |
| Dry Blank - PVDF | 1542[a] | 741 | −51.9 |
| 1 wt % PVME in Water - HALAR | 138 | 74 | −46.4 |

[a]Since the dry blank was NOT to be treated with ethanol (including wetting out), it was assumed that the permeabilities for the two standard samples are identical, since they are obtained from the same source.

Soaking PVDF fibre membranes in PVME did not appear to modify the mechanical properties of any of the samples in any way. Treated membranes demonstrated the same break extensions as untreated samples.

Dope Addition Studies

TIPS Membranes

PVME was added to standard TIPS PVDF or TIPS Poly(ethylene-chlorotrifluoroethylene) (sold under the trademark HALAR) dope in proportions varying from 0 to 1 wt %. The TIPS extrusion was operated in a continuous process (although there is nothing to prohibit its use in batch processes if desired). For PVDF, PVME was dissolved into the solvent/non-solvent mixture of GTA and diethylene glycol, triethylene glycol or 1,4-butanediol. For Poly(ethylene-chlorotrifluoroethylene) sold under the trademark HALAR, PVME was simply dissolved in GTA. PVME is highly soluble in GTA but insoluble in more polar compounds like diethylene glycol, triethylene glycol and 1,4-butanediol.

Because this mixture was between 40-60 wt % non-solvent, there was a maximum amount of PVME that could be dissolved into the solvent/non-solvent mixture (approx. 0.7 wt %). However, membranes formed with this proportion of PVME gave SEMs that suggested some de-mixing of PVDF was occurring. Thus, in most circumstances, it is envisaged that a sub-saturation level of PVME was required.

Membranes were prepared with concentrations as a proportion of the dope mixture of 0.1-0.2 wt % and their properties tested. There was no indication from any of the experiments of any thermal instability of PVME during extrusion of the membranes. Table 5 below shows the details of the different TIPS membranes.

wet out, while some sections remained dry, but would wet with the assistance of ethanol. However, with 0.2 wt % PVME present in the fibre complete hydrophilisation appeared to have taken place.

It is also noted that higher proportions of PVME in the membrane appear to cause a greater degree of asymmetry, which up to a point is a desirable property in MF and IF membranes. Although the samples with 0.5 and 1 wt % PVME show evidence of de-mixing as discussed earlier, they also show a high degree of asymmetry which can be attributed directly to the PVME in the structure. In addition this de-mixing can be used to induce small pores by working as a nucleating agent and encouraging phase separation. The rela-

TABLE 5

DETAILS OF TIPS MEMBRANES PREPARED WITH PVME IN DOPE

|  | 0.1 wt % PVME | 0.2 wt % PVME | 0.5 wt % PVME | 1 wt % PVME | 0.5 wt % PVME | 1 wt % |
|---|---|---|---|---|---|---|
| Polymer Type | 50/50 Solef 1015 - Kynar 461 | 50/50 Solef 1015 - Kynar 460 | 50/50 Solef 1015 - Kynar 450 | Solef 1015 | HALAR 901 | HALAR 901 |
| Polymer Concentration (wt %) | 24 | 24 | 24 | 18 | 18 | 18 |
| Solvent-Non-solvent | GTA - Diethylene glycol | GTA - Diethylene glycol | GTA - Diethylene glycol | GTA - Diethylene glycol | GTA | GTA |
| Solv./Non-solv. Ratio (wt %) | 40:60 | 40:60 | 45:55 | 40:60 | 100 | 100 |
| Coating Solvent | Triacetin | Citroflex 2 | Triacetin Citroflex 2 | Triacetin | GTA | GTA |
| Coating Non-solvent | Diethylene Glycol | Triethylene Glycol | — | Diethylene Glycol | — | — |
| Coating Solv./Non-solv. Ratio (wt %) | 68:32 | 45:55 | 90:10 | 50:50 | 100 | 100 |
| Quench Type | Water | Water | PEG 200 | Water | Water | Water |
| Break Extension (%) | 152 | 228 | 35 | — | 156 | 173 |
| Break Force/unit area (N/mm$^2$) | 5.1 | 7.08 | 2.98 | — | 5.94 | 5.59 |
| Permeability (LMH/bar) Bubble Point | 4838 | 1440 | 301 | — | 1367 | 707 |
| Bubble Point | 250 | 390 | 460 | — | 450 | 200 |
| Fibre Wicking | Partially | Yes | Yes | Yes | — | — |

The differences between the structures of the membranes, as observed by SEM for the samples with and without PVME are only minor for 0.1 and 0.2 wt %. These can be seen in FIGS. 2 and 3. Slightly larger than average cells within the structure can be seen in the SEMs of samples that have been prepared with PVME. However at about 0.5 wt % some immiscibility is apparent and there is some de-mixing occurring. At the 1 wt % level this de-mixing has become more extreme. In the case of PVDF, this is most likely due to the high proportion of non-solvent used in the dope mixture to extrude the membrane fibres. In the case of Poly(ethylene-chlorotrifluoroethylene) sold under the trademark HALAR, which can be seen in FIG. 4, demixing is most likely due to immiscibly with the base polymer (HALAR) as there is no non-solvent present.

Figure 2:
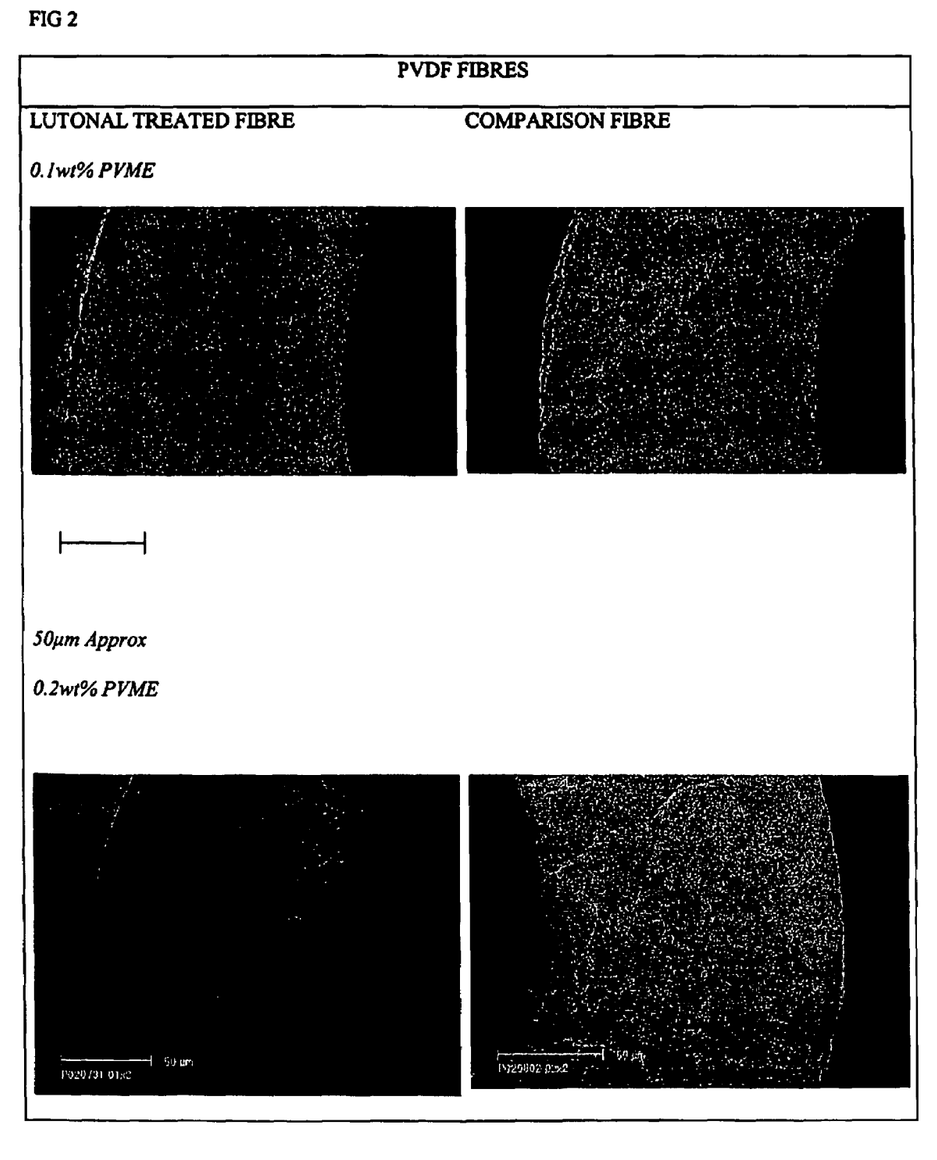
FIGS. 2 and 3 depict the differences between the structures of PVDF membranes for samples with and without PVME.
Figure 3:
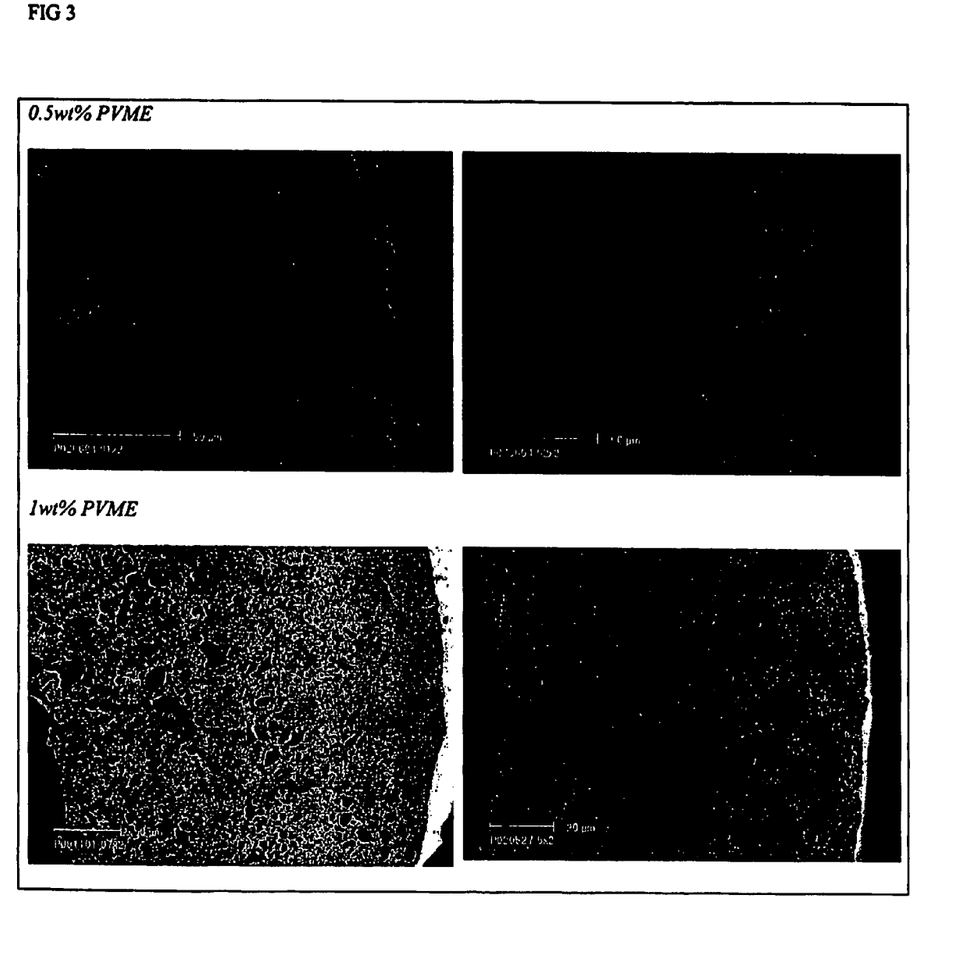
Figure 4:
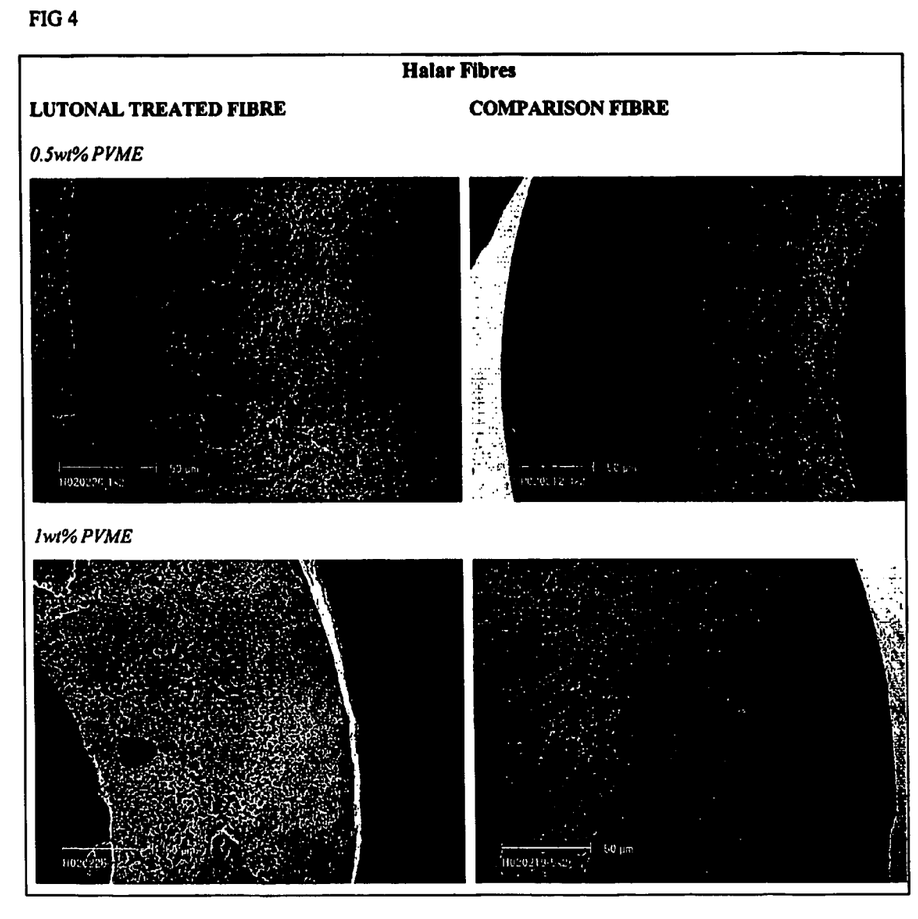
FIG. 4 illustrates demixing in the case of Halar membranes.

However such a high proportion of PVME does not appear to be necessary to impart hydrophilicity to the fibres. 0.1 wt % appears sufficient to commence hydrophilising the membrane, but at this level there appears to be some portions of the fibres that were not hydrophilic; that is to say that upon immersion in water only sections of the fibre could be seen to tionship between asymmetry and PVME content is demonstrated by the trend toward increasing bubble point as the PVME content increases.

In summary, incorporating PVME into the dope in TIPS trials was successful in imparting hydrophilicity to the membranes. The proportion of PVME used was most preferably between 0.1 and 0.5%, although this is dependent upon the amount of non solvent in the dope. If the proportion of non solvent used was lower than 60 wt %, a larger amount of PVME could be incorporated into the dope. However, the preferred range recited above is sufficient in most cases to begin to induce structural changes in the membrane such as asymmetry and smaller pores, as well as cause the membrane to be hydrophilic.

DIPS Membranes

Three dopes were prepared with the compositions listed in Table 6 below. Two different proportions of PVME (0.1 wt % and 2.5 wt %) were compared with a DIPS PVDF dope that contained poly(vinylpyrrolidone-vinylacetate) (S630) as an alternative additive. These fibres were all extruded in an identical manner and the results are compared below.

TABLE 6

|  | Standard | 0.4 wt % PVME | 2.3 wt % PVME |
|---|---|---|---|
| Dope Properties | | | |
| PVDF Conc. (wt %) | 13 | 13 | 13 |
| S630 Conc. (wt %) | 2.6 | 0 | 0 |
| PVME Conc. (wt %) | 0 | 0.4 | 2.3 |
| Pore Forming Agent Conc. (wt %) | 3 | 3 | 3 |
| Water Conc. (wt %) | 2 | 1.8 | 2.3 |
| NMP Conc. (wt %) | 79.4 | 81.8 | 79.4 |
| Fibre Properties | | | |
| Break Extension (%) | 182 | 217 | 260 |
| Break Force (N) | 0.78 | 1.03 | 1.32 |
| Break Force/mm$^2$ (N/mm$^2$) | 3.81 | 4.83 | 4.12 |
| Permeability (LMH/bar) | 620 | 134 | 359 |
| Bubble Point (kPa) | 300 | 500 | 500 |
| Fibre Wicking | Yes | Yes | Yes |

The fibres show an increase in break extension, break force and bubble point by when PVME was added. Without wishing to be bound by theory, these increases may be partly due to a viscosity effect in that replacing S630 with PVME results in a more viscous dope which may in turn lead to fewer macrovoids and a more robust structure, giving a higher break force and break extension, and also possibly contributing to the increase in bubble point. The variation in permeability is possibly due to the change in water (non-solvent) concentration between the samples.

Figure 5:
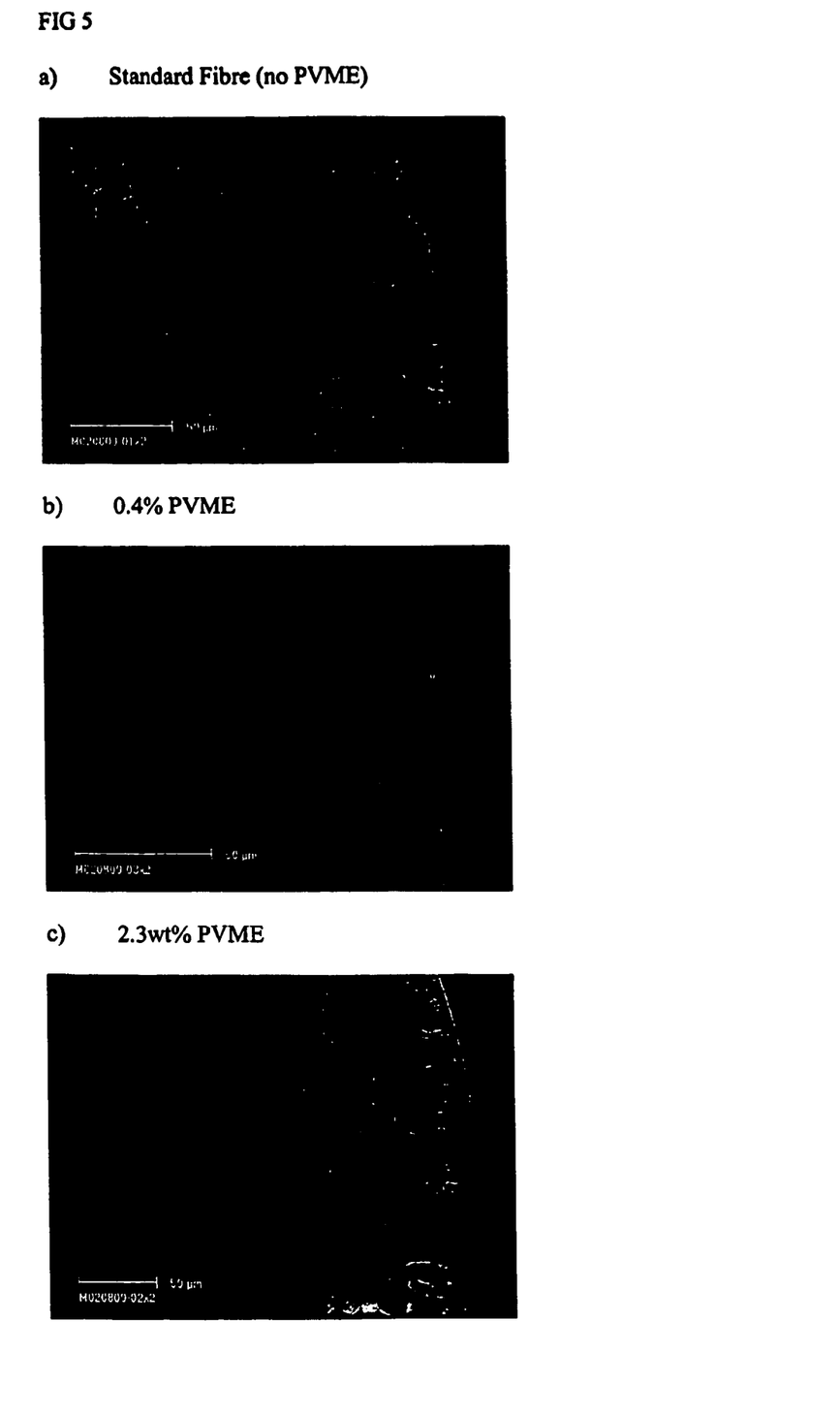
FIG. 5 depicts a decrease in the formation of macrovoids due to the addition of PVME.

The SEMs in FIG. 5 demonstrate the trend apparent from the fibre properties—adding PVME to the structure decreases the formation of macrovoids. Less than a 0.4 wt % replacement of S630 with PVME is required to induce a dramatic change in properties however, as demonstrated by the DIPS examples.

All samples wicked water quite thoroughly, and there was no difference observed from the hydrophilicity of the standard formulation. The permeability measurements were conducted without a 'wetting' step—a manual wetting out of the membrane with ethanol. The permeability of 2.3 wt % PVME samples appears to increase over 0.4 wt % PVME samples. Since the bubble point is the same for these two samples while permeability varies, it can be seen that increasing the PVDF concentration and adding different PVME concentrations allow a UF membrane with a high permeability to be produced.

The claim of the invention are as follows:

1. A polymeric ultra or microfiltration membrane incorporating PVME wherein the PVME is incorporated in the membrane as a homogeneous or heterogeneous dispersion throughout the membrane and the PVME is present as a coating on the membrane.

2. A polymeric ultra or microfiltration membrane according to claim 1 wherein the PVME is present as a coating on the membrane and is incorporated in the membrane as a homogeneous dispersion throughout the membrane.

3. A membrane according to claim 1 wherein the polymeric ultra or microfiltration membrane includes one or more of Halar, PVDF or PP.

4. A membrane according to claim 1 which is hydrophilic.

5. A membrane according to claim 1 which has an asymmetric structure.

6. A membrane according to claim 1 having reduced pore size as a result of the addition of PVME.

7. A membrane according to claim 1 substantially free from macrovoids.

8. A membrane according to claim 1 including cross linked PVME.

9. A polymeric ultra or microfiltration membrane incorporating adsorbed PVME and embedded PVME and wherein adsorbed PVME is cross-linked with embedded PVME.

10. A polymeric ultra or microfiltration membrane according to claim 9 containing PVDF and PVME in a ratio of 0.1:24 to 0.5 to 24.

11. A polymeric ultra or microfiltration membrane according to claim 9 containing 0.4 to 30 wt % PVME.

12. A polymeric ultra or microfiltration according to claim 9 which on soaking for 8 hours produces a detectable quantity of PVME.

13. A polymeric ultra or microfiltration membrane according to claim 9 containing PVME which on soaking for 48 hours produces a leachate having at least 5 ppm PVME.

14. A hydrophobic polymeric ultra or microfiltration membrane according to claim 9 rendered hydrophilic by contacting the membrane with an aqueous or alcoholic solution of PVME with a concentration 0.05 to 5 wt %.

15. A method of hydrophilising a membrane prepared from a polymeric material, said method including the step of contacting said polymeric material with a compatible at least partially water soluble copolymer containing vinylmethyl ether monomer and at least one other co-monomer.

16. A method according to 15 wherein the vinylmethyl ether monomer is present in an amount of at least 50 mole % of the polymeric hydrophilising agent.

17. A method according to 15 wherein the co-monomer is selected from the group consisting of: co-polymerisable acrylate monomers and copolymerisable vinyl monomers.

18. A method of modifying the hydrophobic/hydrophilic balance of a polymer membrane prepared from a polymeric material, said method including the step of contacting said polymeric material with polyinylmethyl ether (PVML) to produce a modified polymeric membrane wherein the polymeric membrane is an ultrafiltration membrane or a microfiltration membrane.

19. A method according to claim 18 wherein the polymeric membrane is coated with PVME.

20. A method according to claim 18 wherein the polymeric material is a hydrophobic polymer and hydrophobic/hydrophilic balance of the polymer is modified to provide a hydrophilic modified polymeric membrane.

21. A method according to claim 18 wherein the polymeric material is poly(vinylidene fluoride) (PVDF), poly(ethylene-chlorotrifluoroethylene) (Halar) and poly(propylene)(PP) or mixtures thereof.

22. A method according to claim 18 wherein the polymeric material is a formed membrane treated with a solution of PVME at a concentration and for a time sufficient to allow PVME saturation of said membrane to take place.

23. A method according to claim 22 wherein the polymeric material is post treated by soaking in a solution of PVME in ethanol.

24. A method according to claim 23 wherein the polymeric material is post treated by soaking in a solution of PVME in water.

25. A method according to claim 18 wherein the concentration of PVME is less than 10%.

26. A method according to claim 25 wherein the concentration of PVME is greater than 0.1%.

27. A method according to claim 18 wherein treatment with PVME takes place for between 5 minutes and 16 hours.

28. A method according to claim 27 wherein treatment with a solution of PVME is followed by a rinsing stage to remove unbound PVME.

29. A method according to claim 18 wherein the polymeric material is treated with PVME b means of adding PVME to membrane dope prior to casting.

30. A method according to claim 29 wherein the membrane dope is cast via a thermally induced phase separation process.

31. A method according to claim 30 wherein the membrane dope includes PVME in an amount up to 1 wt %.

32. A method according to claim 31 wherein the membrane dope is cast via a diffusion induced phase separation process.

33. A method according to claim 32 wherein the membrane dope includes PVME in an amount higher than 1 wt %.

34. A method according to claim 32 wherein the PVME is dissolved in a polymer dope/solvent/non-solvent mixture.

35. A method according to claim 34 wherein the solvent/non-solvent mixture includes a PVME solvent and PVME non-solvent.

36. A method according to claim 34 wherein the PVME solvent possesses weak polarity.

37. A method according to claim 34 wherein the PVME solvent is glyceroltriacteate.

38. A method according to claim 35 wherein the PVME non-solvent is strongly polar.

39. A method according to claim 38 wherein the PVME non-solvent is diethylene, glycol, triethylene glycol, 1,4-butanediol or mixtures thereof.

40. A method according to claim 35 herein the solvent mixture includes from 40-60% non-solvent.

41. A method according to claim 40 wherein the solvent mixture includes PVME in amount of 0.1-2 wt %.

42. A method according to claim 32 herein the method of casting is a TIPS process further including treatment with a coating solution.

43. A method according to claim 32 wherein the method of casting is a TIPS process further including treatment with a coating solution which contains a solvent and a non-solvent.

44. A method according to claim 39 wherein the process is a DIPS process where N-methylpyrrolidone is present as a solvent, and water is present as non-solvent.

45. A method according to claim 16 wherein PVME is incorporated in the membrane dope and formed into a membrane, and wherein said membrane is further treated with PVME.

46. A method according to claim 16 wherein the membrane is treated to cross-link incorporated and/or adsorbed PVME.

47. A method according to claims 46 wherein the method of cross linking is e-beam.

* * * * *

UNITED STATES PATENT AND TRADEMARK OFFICE
CERTIFICATE OF CORRECTION

PATENT NO. : 7,662,212 B2  Page 1 of 1
APPLICATION NO. : 10/564024
DATED : February 16, 2010
INVENTOR(S) : Mullette et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,662,212 B2 | Page 1 of 1 |
| APPLICATION NO. | : 10/564024 | |
| DATED | : February 16, 2010 | |
| INVENTOR(S) | : Daniel Mullette et al. | |

It is certified that error appears in the above-identified patent and that said Letters Patent is hereby corrected as shown below:

In column 16, line 17, replace "16" with "15".

In column 16, line 21, replace "16" with "15".

Signed and Sealed this
Third Day of May, 2011

David J. Kappos
*Director of the United States Patent and Trademark Office*

(12) EX PARTE REEXAMINATION CERTIFICATE (8853rd)
United States Patent
Mullette et al.

(10) Number: US 7,662,212 C1
(45) Certificate Issued: Feb. 14, 2012

(54) MEMBRANE POST TREATMENT (75) Inventors: Daniel Mullette, New South Wales (AU); Joachim Muller, New South Wales (AU); Neeta Patel, New South Wales (AU)

(73) Assignee: Siemens Industry, Inc., Alpharetta, GA (US)

Reexamination Request:
No. 90/011,714, Jul. 8, 2011

Reexamination Certificate for:
Patent No.: 7,662,212
Issued: Feb. 16, 2010
Appl. No.: 10/564,024
Filed: Jan. 9, 2006

Certificate of Correction issued Nov. 30, 2010.

Certificate of Correction issued May 3, 2011.

(22) PCT Filed: Jul. 8, 2004

(86) PCT No.: PCT/AU2004/000922
§ 371 (c)(1),
(2), (4) Date: Jan. 9, 2006

(87) PCT Pub. No.: WO2005/002712
PCT Pub. Date: Jan. 13, 2005

(30) Foreign Application Priority Data
Jul. 8, 2003 (AU) .................................. 2003903507

(51) Int. Cl.
*B01D 39/20* (2006.01)
*B01D 53/22* (2006.01)

(52) U.S. Cl. .................. 95/45; 210/490; 210/500.27; 210/500.28; 210/500.42; 210/640; 210/650; 210/651; 427/244; 427/245; 427/331; 427/430.1; 55/524; 55/DIG. 5; 96/11; 96/13; 96/14; 96/4; 96/54

(58) Field of Classification Search ................... None
See application file for complete search history.

(56) References Cited

To view the complete listing of prior art documents cited during the proceeding for Reexamination Control Number 90/011,714, please refer to the USPTO's public Patent Application Information Retrieval (PAIR) system under the Display References tab.

*Primary Examiner* — Alan Diamond (57) ABSTRACT

The invention relates to polymeric ultrafiltration or microfiltration membranes of, for instance, Halar, PVDF or PP, incorporating PVME or vinyl methyl ether monomers. The PVME may be present as a coating on the membrane or dispersed throughout the membrane or both. The membranes are preferably hydrophilic with a highly asymmetric structure with a reduced pore size and/or absence of macrovoids as a result of the addition of PVME. The PVME maybe cross-linked. The invention also relates to methods of hydrophilising membranes and/or preparing hydrophilic membranes via thermal or diffusion induced phase separation processed.

a) Standard Fibre (no PVME)

b) 0.4% PVME c) 2.3wt% PVME

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 19, 29 and 32-44 are cancelled.

Claims 1-18, 20-28, 30, 31 and 45-47 are determined to be patentable as amended.

New claims 48-67 are added and determined to be patentable.

1. A polymeric ultra or microfiltration membrane incorporating [PVME] *polyvinylmethyl ether (PVME)* wherein the PVME is incorporated in the membrane as a homogeneous or heterogeneous dispersion throughout the membrane and the PVME is present as a coating on the membrane.

2. [A] *The* polymeric ultra or microfiltration membrane according to claim 1 wherein the PVME is present as a coating on the membrane and is incorporated in the membrane as a homogeneous dispersion throughout the membrane.

3. [A] *The* membrane according to claim 1 wherein the polymeric ultra or microfiltration membrane includes one or more [Halar, PVDF or PP] *poly(ethylene chlorotrifluoroethylene), polyvinylidene fluoride (PVDF) and polypropylene (PP)*.

4. [A] *The* membrane according to claim 1 [which] *wherein the membrane* is hydrophilic.

5. [A] *The* membrane according to claim 1 [which has] *comprising* an asymmetric structure.

6. [A] *The* membrane according to claim 1 [having] *comprising a* reduced pore size as a result of the addition of PVME.

7. [A] *The* membrane according to claim 1 *that is* substantially free from macrovoids.

8. [A] *The* membrane according to claim 1 [including cross linked] *comprising cross-linked* PVME.

9. A polymeric ultra or microfiltration membrane incorporating adsorbed [PVME] *polyvinylmethyl (PVME)* and embedded PVME and wherein adsorbed PVME is cross-linked with embedded PVME.

10. [A] *The* polymeric ultra or microfiltration membrane according to claim 9 [containing] *comprising* PVDF and PVME in a ratio of 0.1:24 to [0.5 to 24] *0.5:24*.

11. [A] *The* polymeric ultra or microfiltration membrane according to claim 9 [containing] *comprising* 0.4 to 30 wt % PVME.

12. [A] *The* polymeric ultra or microfiltration *membrane* according to claim 9 which [on] *upon* soaking for 8 hours produces a detectable quantity of PVME.

13. [A] *The* polymeric ultra or microfiltration membrane according to claim 9 [containing] *comprising* PVME which [on] *upon* soaking for 48 hours produces a leachate having at least 5 ppm PVME.

14. [A] *The* hydrophobic polymeric ultra or microfiltration membrane according to claim 9 rendered hydrophilic by contacting the membrane with an aqueous or alcoholic solution of PVME with a concentration 0.05 to 5 wt %.

15. A method of hydrophilising a membrane prepared from a polymeric material, [said] *the* method [including the step of] *comprising* contacting [said] *the* polymeric material with a compatible at least partially water soluble copolymer [containing] *comprising* vinylmethyl ether monomer and at least one other co-monomer.

16. [A] *The* method according to 15 wherein the vinylmethyl ether monomer is present in an amount of at least 50 mole % of the polymeric hydrophilising agent.

17. [A] *The* method according to 15 wherein the co-monomer is selected from the group consisting of: co-polymerisable acrylate monomers and [co polymerisable] *co-polymerisable* vinyl monomers.

18. A method of modifying the hydrophobic/hydrophilic balance of a polymer membrane prepared from a polymeric material, [said] *the* method [including the step of PVME] *comprising:*
   preparing a membrane dope solution comprising *polyvinylmethyl ether (PVME) and the polymeric material;*
   *casting the membrane dope solution to produce a polymer membrane; and*
   contacting [said polymeric material with polyvinylmethyl ether (PVML)] *the polymer membrane with PVME* to produce a [modified polymer] *coated polymer* membrane wherein the [polymeric] *coated polymer* membrane is an ultrafiltration membrane or a microfiltration membrane.

20. [A] *The* method according to claim 18 wherein the polymeric material is a hydrophobic polymer and *the* hydrophobic/hydrophilic balance of the polymer *membrane* is modified to provide a hydrophilic modified polymeric membrane.

21. [A] *The* method according to claim 18 wherein the polymeric material is *selected from the group consisting of* poly(vinylidene fluoride) (PVDF), poly(ethylenechlorotrifluoroethylene) [(Halar)] poly(propylene)(PP) [or] *and* mixtures thereof.

22. [A] *The* method according to claim 18 wherein [the polymeric material is a formed membrane treated] *contacting the polymer membrane with PVME comprises treating the polymer membrane* with a solution of PVME at a concentration and for a time sufficient to allow PVME saturation of [said] *the polymer* membrane to take place.

23. [A] *The* method according to claim 22 wherein [the polymeric material is post treated by] *contacting the polymer membrane with PVME comprises* soaking *the membrane* in a solution of PVME in ethanol.

24. [A] *The* method according to claim [23] *22* wherein [the polymeric material is posted treated by] *contacting the polymer membrane with PVME comprises* soaking *the membrane* in a solution of PVME in water.

25. [A] *The* method according to claim [18] *22* wherein the concentration of PVME is less than 10%.

26. [A] *The* method according to claim 25 wherein the concentration of PVME is greater than 0.1%.

27. [A] *The* method according to claim [18] *22* wherein [treatment] *treating the polymer membrane with PVME comprises soaking the membrane* with *the solution of* PVME [takes place for] *for* between 5 minutes and 16 hours.

28. [A] *The* method according to claim 27 wherein [treatment] *treating* with a solution of PVME is followed by a rinsing stage to remove unbound PVME.

30. [A] *The* method according to claim [29] *18* wherein casting the membrane dope [is cast via] *comprises* a thermally induced phase separation process.

31. [A] *The* method according to claim 30 wherein the membrane dope [includes] *comprises* PVME in an amount up to 1 wt %.

45. [A] *The* method according to claim 15 [wherein PVME is incorporated in the membrane dope and formed into a membrane] *further comprising preparing a membrane dope comprising vinylmethyl ether monomer and the polymeric material to form a membrane*, and [wherein said membrane is further treated] *contacting the membrane with* PVME.

46. [A] *The* method according to claim 15 [wherein the membrane is treated to cross-link] *further comprising crosslinking an* incorporated and/or *an* adsorbed PVME.

47. [A] *The* method according to [claims] *claim* 46 wherein the method of [cross linking is e-beam] *crosslinking comprises electron beam irradiation*.

48. The method according to claim 30 wherein the membrane dope solution comprises PVME dissolved in a solvent/non-solvent mixture.

49. The method according to claim 48 wherein the solvent/non-solvent mixture includes a PVME solvent and a PVME non-solvent.

50. The method according to claim 49 wherein the PVME solvent possesses weak polarity.

51. The method according to claim 50 wherein the PVME solvent is glyceroltriacetate.

52. The method according to claim 49 wherein the PVME non-solvent is strongly polar.

53. The method according to claim 52 wherein the PVME non-solvent is selected from the group consisting of diethylene glycol, triethylene glycol, 1,4-butanediol and mixtures thereof.

54. The method according to claim 49 wherein the solvent/non-solvent mixture comprises non-solvent in an amount 40 weight % to 60 weight %.

55. The method according to claim 49 wherein the solvent/non-solvent mixture comprises PVME in an amount of 0.1 weight % to 1 weight %.

56. The method according to claim 30 wherein casting further comprises treating with a coating solution.

57. The method according to claim 56 wherein the coating solution comprises a solvent and a non-solvent.

58. The method according to claim 18 wherein casting the membrane dope comprises a diffusion induced phase separation process.

59. The method according to claim 58 wherein the membrane dope comprises PVME in an amount greater than 1 weight %.

60. The method according to claim 58 wherein the membrane dope solution comprises PVME dissolved in a solvent/non-solvent mixture.

61. The method according to claim 60 wherein the solvent/non-solvent mixture includes a PVME solvent and a PVME non-solvent.

62. The method according to claim 61 wherein the PVME solvent possesses weak polarity.

63. The method according to claim 62 wherein the PVME solvent is glyceroltriacetate.

64. The method according to claim 61 wherein the PVME non-solvent is strongly polar.

65. The method according to claim 64 wherein the PVME non-solvent is selected from the group consisting of diethylene glycol, triethylene glycol, 1,4-butanediol and mixtures thereof.

66. The method according to claim 61 wherein the solvent/non-solvent mixture includes N-methylpyrrolidone as a PVME solvent and water as a PVME non-solvent.

67. The method according to claim 61 wherein the solvent/non-solvent mixture comprises PVME in an amount of 0.1 weight % to 2.3 weight %.

\* \* \* \* \*